United States Patent Office 3,734,957
Patented May 22, 1973

3,734,957
METHOD FOR THE PRODUCTION OF α,α-DI-ALKYL-β-CHLOROPROPIONIC ACIDS
Moustafa El-Shahawi, Kenntemich-Platz, and Hermann Richtzenhain, Post Marialinden, Germany, assignors to Dynamit Nobel AG, Troisdorf, Germany
No Drawing. Filed Mar. 26, 1970, Ser. No. 23,038
Claims priority, application Germany, Apr. 1, 1969, P 19 16 684.8
Int. Cl. C07c 53/32
U.S. Cl. 260—539 R    4 Claims

ABSTRACT OF THE DISCLOSURE

A method for the production of β-chloropropionic acids disubstituted in α-position by alkyl residues having 1 to 4 C-atoms, by treating β-hydroxypropionaldehyde or its acetals disubstituted in α-position by alkyl residues having 1 to 4 C-atoms with chlorine in the presence of water or aqueous hydrochloric acid, and heating the resulting reaction mixture to temperatures between 100 and 200° C.

---

Of the β-chloropropionic acids substituted in α-position by alkyl residues with 1 to 4 C-atoms, so far only chloropivalic acid is known. It was first produced from pivalic acid by treatment with sulfuryl chloride and dibenzoyl peroxide (J. Am. Chem. Soc. 62 (1940) 925–929). It can also be produced by direct chlorination of pivalic acid in accordance with Fr. P. 1,537,440, when a stoichiometric deficiency of chlorine is used. French Patent 1,486,033 describes the production of chloropivalic acid by the reaction of hydroxypivalic acid with hydrogen chloride under pressure. Finally chloropivalic acid can also be produced from 1,2-dichloro-2-methyl-propane by reaction with carbon monoxide and water in the presence of hydrofluoric acid in accordance with U.S. Patent 3,385,888.

In these known production methods, pivalic acid, 1,2-dichloro-2-methyl-propane or hydroxypivalic acid serve as starting materials. Pivalic acid and 1,2-dichloromethylpropane are accessible from isobutylene, while the hydroxypivalic acid can be produced by oxidation of formisobutyraldol with oxygen under pressure.

Substituted β-hydroxypropionaldehydes used for the present method are, however, easily accessible by condensation of formaldehyde with isobutyraldehyde or corresponding α,α disubstituted aldehydes.

It has now been found that in accordance with the present invention the production of α,α-dialkyl-β-chloropropionic acids is possible in general in accordance with a one-step method, starting from α,α-dialkyl-β-hydroxypropionaldehydes. The invention is based on the surprising observation that α,α-dialkyl-β-hydroxypropionaldehyde can be so selectively oxidized by chlorine in the presence of water or aqueous hydrochloric acid that as intermediate products the corresponding β-hydroxypropionic acids are formed and these can be converted into the corresponding α,α-dialkyl-β-chloropropionic acids without isolation by increasing the temperature in the presence of the hydrogen chloride formed in the reaction. The reaction corresponds to the following gross equation:

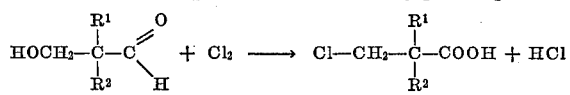

$R^1$ and $R^2$ therein signify the same or different alkyl groups with 1 to 4 C-atoms.

In the first phase of the method in accordance with the invention α,α-dialkyl-β-hydroxypropionaldehyde is reacted with chlorine, emulsified or suspended in water or aqueous hydrochloric acid, in approximately stoichiometric quantities, possibly under pressure. The temperature of this chlorination is between about 0 and 100° C., with temperatures between 20 and 80° C. are preferred. The amount of water used is insufficient to completely dissolve all of the hydrogen chloride formed in the reaction so as to form concentrated hydrochloric acid. Aqueous hydrochloric acid may be used instead of water in which case the reaction mixture contains, per mol of the α,α-dialkyl-β-hydroxypropionaldehyde, more hydrogen chloride than the 2 mols of hydrogen chloride formed after the completion of the chlorination. Preferably, the reaction mixture contains about 6 to 8 mols of hydrogen chloride per mol of hydroxyaldehyde, so that taking into consideration the hydrogen chloride formed during the reaction there should be added to the reaction mixture 4 to 6 mol in the form of aqueous or gaseous hydrochloric acid.

The reaction is carried out in closed containers or autoclaves under the autogenous pressure of the reaction participants, which at the temperatures disclosed may amount to about 50 atmospheres.

The α,α-dialkyl-β-hydroxypropionaldehyde can be added to the reaction mixture in monomeric form. Alternatively, it can also be added in its dimer form, as a cyclic hemiacetal, which forms from the monomer upon standing and which in the presence of acid easily decomposes to the monomer. Instead of the dimeric acetal, however, there may also be used the acetals of the hydroxypropionaldehyde with a 1,2- or 1,3-diol. Instead of α,α-dimethyl-β-hydroxypropionaldehyde, there can be used for example the 2-(hydroxy-t-butyl)-4-methyl-1,3-dioxolane formed from formisobutylraldol and 1,2-propylene glycol, which under the reaction conditions easily splits into the hydroxyaldehyde and propylene glycol.

In accordance with the method, there can thus be produced, among others, the α,α-dimethyl-β-chloropropionic acid (chloropivalic acid), the α,α-diethyl-, α-methyl-α-ethyl-, α,α-di-n-propyl, α,α-di-i-propyl-, α,α-di-n-butyl-, α,α-di-i-butyl, α-methyl-α-butyl- and α-ethyl-α-butyl-β-chloropropionic acid, furthermore however also higher α,α-dialkyl-substituted β-chloropropionic acids.

After completion of the first phase, i.e. after a reaction time of 1 to 2 hours, the reaction mixture is brought to a temperature of between 100 to 200° C., preferably 140 to 180° C. and kept at this temperature until no further drop in pressure occurs. It is usually sufficient to maintain the reaction mixture at this lower temperature for about one to two hours.

The produced α,α-dialkyl-β-chloropropionic acid is extracted with suitable solvents from the reaction mixture. Solvents such as those which are indifferent to strong hydrochloric acid, for example aliphatic or aromatic hydrocarbons or preferably chlorinated hydrocarbons, especially low-boiling ones, such as methylene chloride, chloroform, carbon tetrachloride, 1,2- dichloroethane, 1,2-dichloroethylene, trichloroethylene or perchloroethylene are useful. The extracted aqueous solution may be used, after first adjusting the hydrogen chloride concentration by the addition of or by distilling off a suitable quantity of hydrogen chloride for emulsifying or suspending fresh α,α-dialkyl-β-hydroxy-propionaldehyde. The extract containing the α,α-dialkyl-β-chloropropionic acid is, upon distilling off of the extraction agent, appropriately subjected to a vacuum distillation in order to obtain the produced acid in pure form. However, the product solution can also be conversed directly into α,α-dialkyl-β-propionylactones.

The formed α,α-chloropionic acids, primarily chloropivalic acid, are valuable intermediate products for the production of polymers, which are themselves useful in forming fibers or foils, such as polyesters etc.

The following examples, illustrate this invention.

EXAMPLE 1

408 g. of freshly distilled formisobutyraldol are mixed with 200 g. water and 1580 g. of 36 wt. percent hydrochloric acid in an enameled stirring autoclave. There are introduced 310 g. of chlorine under pressure, whereupon the temperature increases to 50° C. After completion of the reaction, the mixture is heated to 152° C. until no decrease in pressure is observed. After cooling off, the reaction product is extracted with 1,2-dichloroethane whereupon there is 394 g. of chloropivalic acid having a boiling point of (0.4):74–77° C., melting point 40 to 41° C. (yield 72 wt. percent).

EXAMPLE 2

454 g. of 2-(hydroxy-t-butyl)-4-methyl-1,3-dioxolane are mixed with 200 g. of water and 1.580 g. 36 wt. percent hydrochloric acid in an enameled stirring autoclave, and the process carried out as in Example 1 to obtain 305 g. of chloropivalic acid (yield 79 wt. percent).

EXAMPLE 3

158 g. of α-ethyl-α-butyl-β-hydroxypropionaldehyde are mixed with 80 g. of water and 610 g. of 36 wt. percent hydrochloric acid in an enameled stirring autoclave. There are introduced 72 g. of chlorine under pressure and, after completion of the reaction, heated to 158° C. until a decrease in pressure can no longer be observed. There is obtained from the reaction mixture α-ethyl-α-butyl-β-chloropropionic acid, extracted with 1,2-dichloroethane, having a boiling point of (0.3):101–103° C. Refractive index $n_D^{20}=1,4730$, density $d_{23}=1,1192$. $C_9H_{17}O_2Cl$ (mol wt. 192.7) Calculated (percent): C, 56.09; H, 8.95; Cl, 18.41. Found (percent): C, 55.93; H, 9.03; Cl, 18.59.

What is claimed is:

1. Process for the production of α,α di($C_1$–$C_4$) alkyl β-chloropropionic acid comprising reacting an α,α di($C_1$–$C_4$) alkyl β-hydroxypropionaldehyde or its acetal with approximately stiochiometric quantities of chlorine in the presence of water or hydrochloric acid in an amount so that, taking into consideration the hydrochloric acid formed during the reaction, there is added to the reaction mixture, when said reactants comprise chlorine and hydrochloric acid, four to six moles of aqueous or gaseous hydrochloric acid per mole of hydroxyaldehyde at about 0 to 100° C. for a time sufficient to oxidize said aldehyde, the amount of water present being insufficient to dissolve all of the hydrochloric acid formed during the chlorination, and then heating the reaction mixture, without isolating the intermediate product, to temperatures between about 100 and 200° C.

2. Process claimed in claim 1, wherein said chlorination temperature is about 20 to 80° C.

3. Process claimed in claim 1, wherein said reaction mixture contains about 6 to 8 moles of hydrogen chloride per mole of hydroxy aldehyde.

4. Process claimed in claim 2 wherein said chlorination reaction is carried out for about 1 to 2 hours and said reaction mixture is heated to about 140 to 180° C.

References Cited

UNITED STATES PATENTS

| 2,443,118 | 6/1948 | Plump | 260—539 R |
| 3,385,888 | 5/1968 | Martin | 260—539 R |
| 3,432,548 | 3/1969 | Blume | 260—539 R |

FOREIGN PATENTS

| 1,486,033 | 6/1967 | France | 260—539 |
| 988,934 | 4/1965 | Great Britain | 260—539 |

OTHER REFERENCES

Advanced Organic Chemistry: Reactions, Mechanisms and Structure, Jerry Marh, pp. 539–541, 1968.

LORRAINE A. WEINBERGER, Primary Examiner

J. F. TERAPANE, Assistant Examiner